UNITED STATES PATENT OFFICE

CHARLES H. BOWEN, OF WASHINGTON, D. C.

IMPROVEMENT IN DISINFECTING, DEODORIZING, AND ANTISEPTIC COMPOSITIONS.

Specification forming part of Letters Patent No. 168,219, dated September 28, 1875; application filed August 24, 1875.

*To all whom it may concern:*

Be it known that I, CHARLES H. BOWEN, M. D., of Washington, District of Columbia, have invented certain new and useful Improvements in Disinfecting and Deodorizing Composition, of which the following is a specification:

This invention relates to an improved composition of matter for disinfecting and other similar purposes, its object being to produce a compound possessing the necessary deodorizing and antiseptic properties, and which will be free from the objectionable odor and destructive properties of the ordinary disinfectants.

My invention consists in a composition of permanganate of potash, boracic acid, and thymol or thymic acid. These ingredients are combined in various proportions, according to the nature of the use to which the disinfectant is to be applied. For general purposes, however, I take of permanganate of potash one ounce, boracic acid, one-half ounce, and thymol or thymic acid, ten grains. These are thoroughly combined, mixed, and dissolved in water for use. The proportion of water may be varied, as circumstances may require. Generally, however, for the above amount of composition, ten gallons are employed.

The composition thus formed possesses valuable antiseptic and deodorizing properties, and is also destructive to the lower forms of animal life, while at the same time it is free from the disagreeable odor and destructive properties of the ordinary disinfectants.

The permanganate of potash, which is represented by the chemical formula $K_2Mn_2O_8$, acts as a deodorizer and disinfectant by reason of its well-known oxidizing properties, and prevents putrefaction or fermentation. The boracic acid ($H_3BO_3$) acts as a preservative, preventing the decay of animal or vegetable matter, while the thymol or thymic acid, consisting of carbon, hydrogen, and oxygen, represented by the formula $C_{10}H_{14}O_2$ and $C_{20}H_{14}O_2$, is a powerful antiseptic, and combines with decaying animal or vegetable matter, effectually arresting the decomposition thereof.

The three ingredients, when combined, produce a disinfecting compound which is entirely free from unpleasant odor, and which is more efficacious than the disinfectant in ordinary use.

What I claim is—

A new composition of matter for disinfecting and deodorizing purposes, consisting of permanganate of potash, boracic acid, and thymol or thymic acid, as herein described.

In testimony that I claim the foregoing I have hereunto set my hand in the presence of the subscribing witnesses.

CHAS. H. BOWEN, M. D.

Witnesses:
A. H. NORRIS,
J. S. HERBERT.